US012151822B1

(12) United States Patent
Silberg

(10) Patent No.: US 12,151,822 B1
(45) Date of Patent: Nov. 26, 2024

(54) GEOMETRY ADAPTABLE SUPPORTED PARAFOIL

(71) Applicant: The United States of America, as represented by the Secretary of the Navy, Arlington, VA (US)

(72) Inventor: Eric J. Silberg, Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 471 days.

(21) Appl. No.: 17/478,997

(22) Filed: Sep. 20, 2021

(51) Int. Cl.
*B64D 17/02* (2006.01)
(52) U.S. Cl.
CPC .................................. *B64D 17/025* (2013.01)
(58) Field of Classification Search
CPC ................ B64D 17/025; B64C 31/036; B64C 2031/065; B63H 8/14; B64U 10/50
See application file for complete search history.

(56) References Cited

U.S. PATENT DOCUMENTS

| | | | |
|---|---|---|---|
| 2,546,078 A | | 3/1951 | Rogallo et al. |
| 3,285,546 A | | 11/1966 | Jalbert |
| 3,289,976 A | | 12/1966 | Lemoigne |
| 4,708,078 A | * | 11/1987 | Legaignoux ......... B64D 17/025 244/145 |
| 4,865,272 A | | 9/1989 | Schwarz |
| 4,934,630 A | | 6/1990 | Snyder |
| 5,160,100 A | | 11/1992 | Snyder |
| 5,201,482 A | | 4/1993 | Ream |
| 5,244,169 A | * | 9/1993 | Brown ................. B64D 17/025 244/146 |
| 5,678,784 A | | 10/1997 | Marshall, Jr. et al. |
| 5,893,536 A | | 4/1999 | Lee et al. |
| 5,931,416 A | | 8/1999 | Carpenter |

(Continued)

OTHER PUBLICATIONS

Stephen Carlson, "DARPA Demonstrates TALONS Parasail Mast System," United Press International, Inc., upi.com, Aug. 16, 2017, 2 pages printed out Feb. 28, 2022.

(Continued)

*Primary Examiner* — Joshua J Michener
*Assistant Examiner* — Cindi M Curry
(74) *Attorney, Agent, or Firm* — Howard Kaiser

(57) ABSTRACT

An exemplary inventive parafoil includes a soft wing and a semi-rigid skeleton. Configured to effect ram-air flight, the soft wing forms adjacent elongate cells directed from leading edge to trailing edge, with respective inflow vents arranged along the leading edge. The semi-rigid skeleton includes one or more cell-compatible support structures, each joined with a cell in furtherance of maintaining the cell's inflated shape and preventing its collapse under adverse aerodynamic circumstances. Each cell-compatible support structure includes a ring-like frame and two parallel rod-like projections attached perpendicular to the ring-like frame at laterally opposite locations. According to each coupling of a cell-compatible support structure with a cell, the ring-like frame is affixed at or near the cell's inflow vent, fitting onto or inside the cell lip; the two rod-like projections extend backward from the ring-like frame along part of the cell length, each integrated with or interiorly contiguous to the cell.

14 Claims, 17 Drawing Sheets

(56) References Cited

U.S. PATENT DOCUMENTS

| | | | |
|---|---|---|---|
| 6,726,150 B2* | 4/2004 | Preston | B64D 17/025 244/145 |
| 6,824,098 B1 | 11/2004 | Belloso | |
| 6,834,607 B1* | 12/2004 | Johnson | B63B 34/60 114/253 |
| 6,845,948 B2 | 1/2005 | Thomas | |
| 7,178,762 B2 | 2/2007 | Preston | |
| 7,287,481 B1* | 10/2007 | Wrage | B63B 15/0083 114/102.29 |
| 8,286,907 B2 | 10/2012 | Dohi et al. | |
| 9,561,858 B2 | 2/2017 | Leidich et al. | |
| 9,573,691 B1 | 2/2017 | Sadeck et al. | |
| 9,868,537 B2 | 1/2018 | Leidich et al. | |
| 10,232,581 B1 | 3/2019 | Huang | |
| 10,787,268 B2 | 9/2020 | Leidich et al. | |
| 10,960,965 B1* | 3/2021 | Wilkins | B64D 17/18 |
| 2016/0264248 A1 | 9/2016 | MacCallum et al. | |
| 2019/0270522 A1* | 9/2019 | Fields | B64D 17/62 |
| 2021/0070456 A1 | 3/2021 | Leidich et al. | |
| 2021/0171216 A1 | 6/2021 | Brown et al. | |

OTHER PUBLICATIONS

Thomas Gibbons-Neff, "Could the Navy Use Parasailing to Improve Surveillance? DARPA Thinks So," The Washington Post, Sep. 29, 2015, available online www.washingtonpost.com.

"TALONS Tested on Commissioned U.S. Navy Vessel for First Time," Defense Advanced Research Projects Agency, outreach@darpa.mil, Aug. 15, 2017, 3 pages printed out Feb. 28, 2022.

"ACTUV Unmanned Vessel Helps TALONS Take Flight in Successful Joint Test," Defense Advanced Research Projects Agency, outreach@darpa.mil, Oct. 24, 2016, 3 pages printed out Feb. 28, 2022.

"TALONS System Mimics a Mast as Tall as a Skyscraper," Defense Advanced Research Projects Agency, outreach@darpa.mil, Sep. 24, 2015, 2 pages printed out Feb. 28, 2022.

Benjamin McKnight III, Nswccd Public Affairs, "Carderock's Eric Silberg Assists with NATO Exercise," Waves, 2019 Issue 4, Naval Surface Warfare Center Carderock Division magazine, pp. 1, 2 (excerpt), 6, and 7.

Eric J. Silberg, "Launch and Recovery of Tethered Elevated Masts from Naval Vessels: Aerodynamic Challenges and Opportunities," Abstract (1 page), submitted to and possibly made available by Multi-Agency Craft Conference (MACC 2018), U.S. Coast Guard Yard, Baltimore, MD, Jul. 18-19, 2018.

Eric J. Silberg, "Launch and Recovery of Tethered Elevated Masts from Naval Vessels: Challenges and Opportunities," slideshow presentation (15 slides), presented at Multi-Agency Craft Conference (MACC 2018), U.S. Coast Guard Yard, Baltimore, MD, Jul. 18-19, 2018.

Joseph Coleman, Hammad Ahmad, and Daniel Toal, "Development and Testing of a Control System for the Automatic Flight of Tethered Parafoils," first published May 16, 2016, Journal of Field Robotics, vol. 34, Issue 3 (May 2017), pp. 519-538, Wiley Periodicals, Inc., wileyonlinelibrary.com.

* cited by examiner

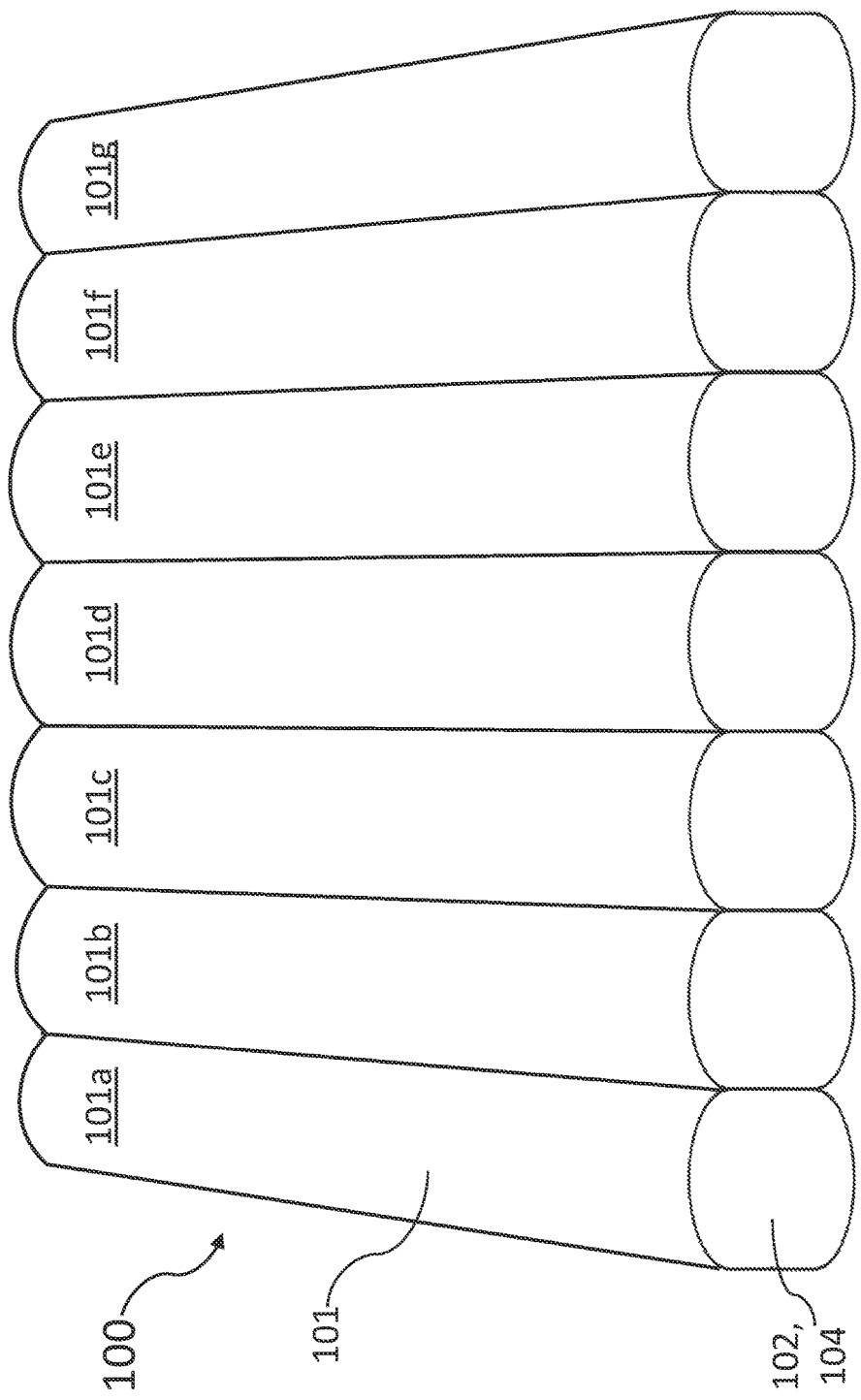
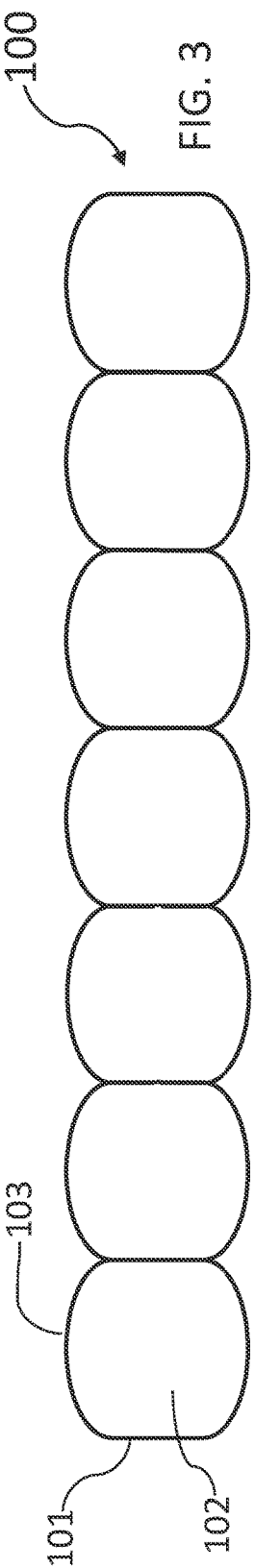

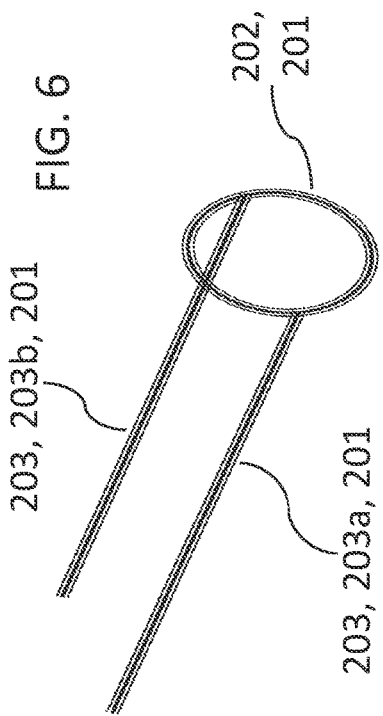
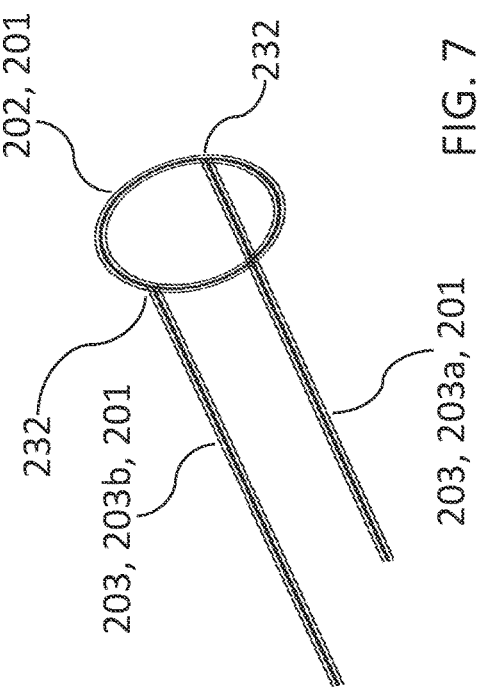
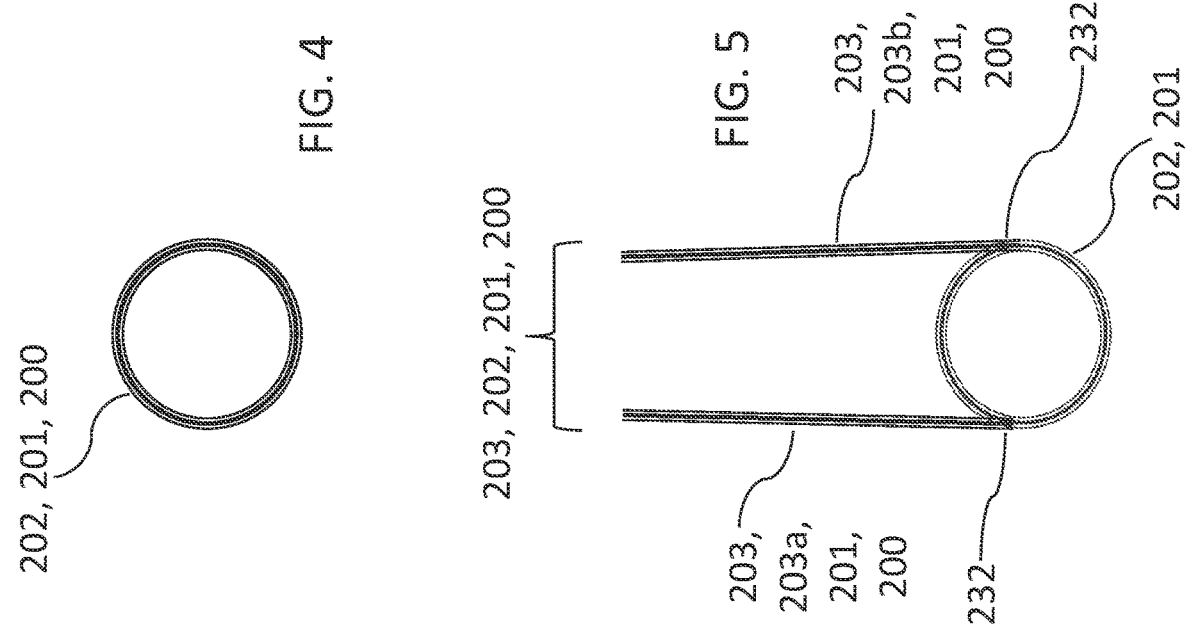

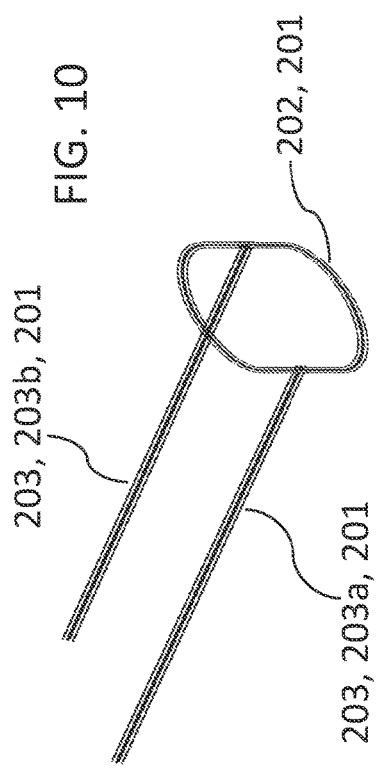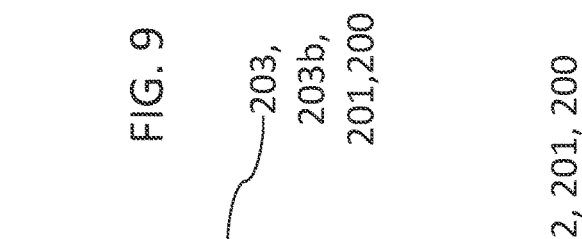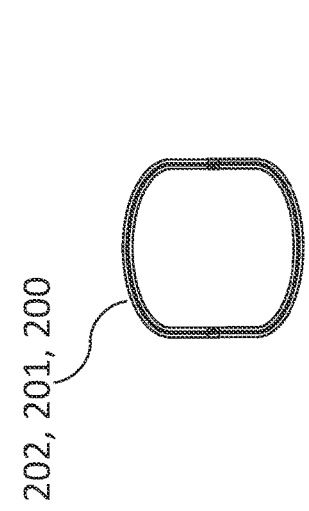

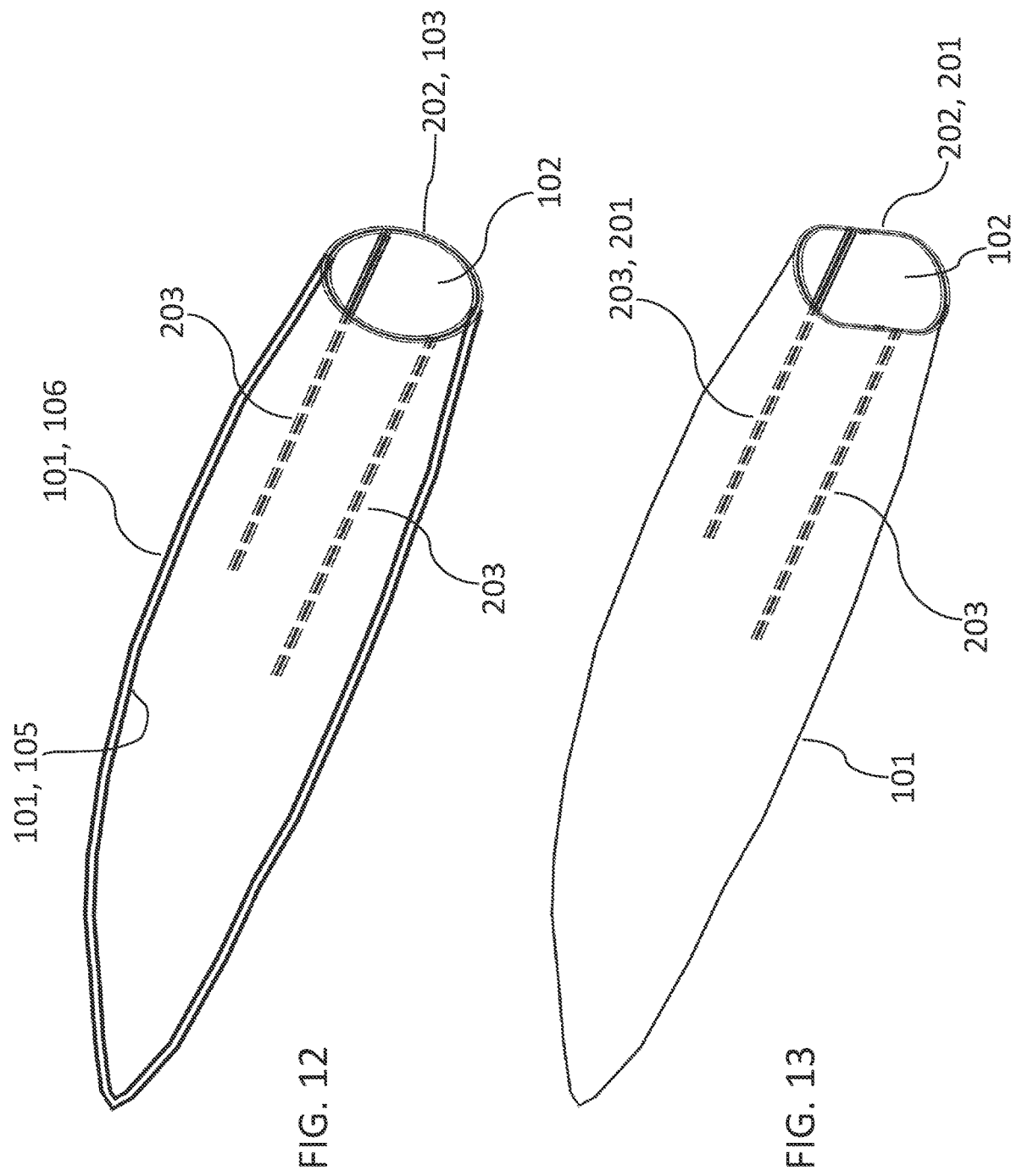

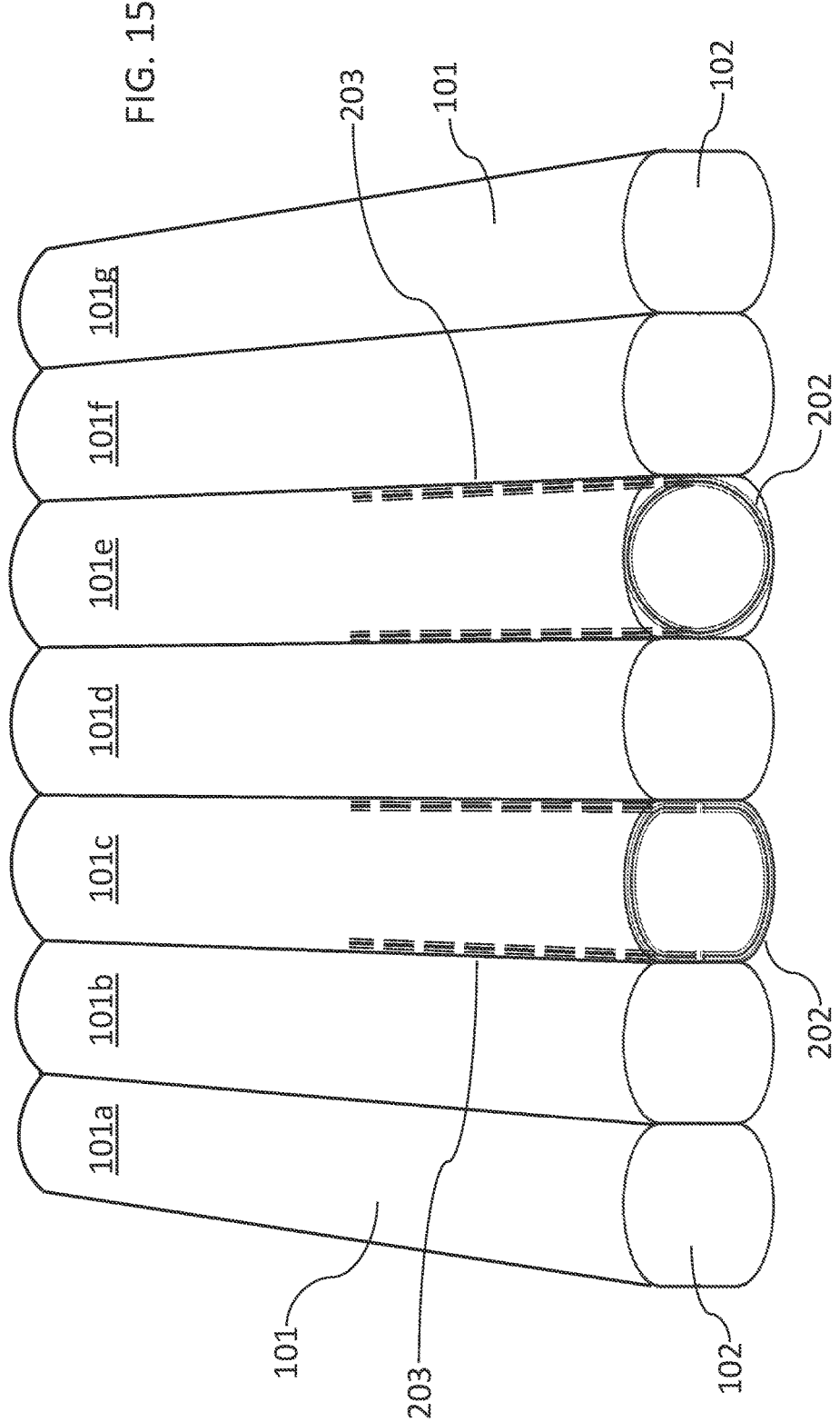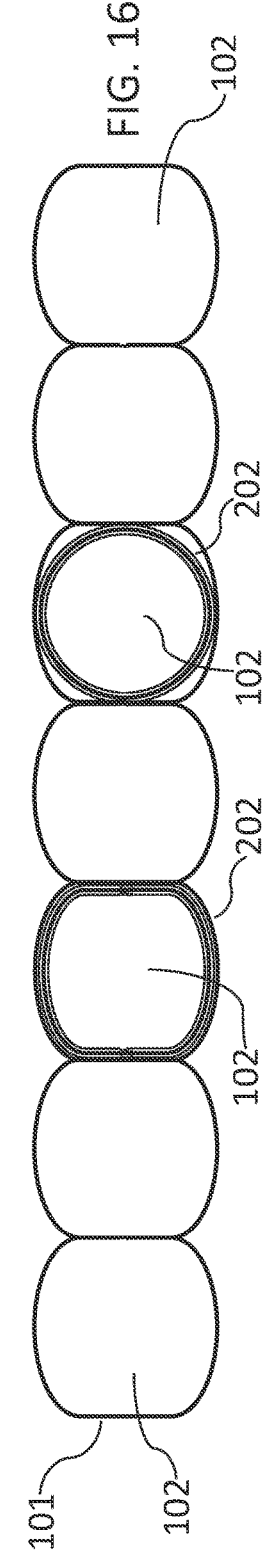

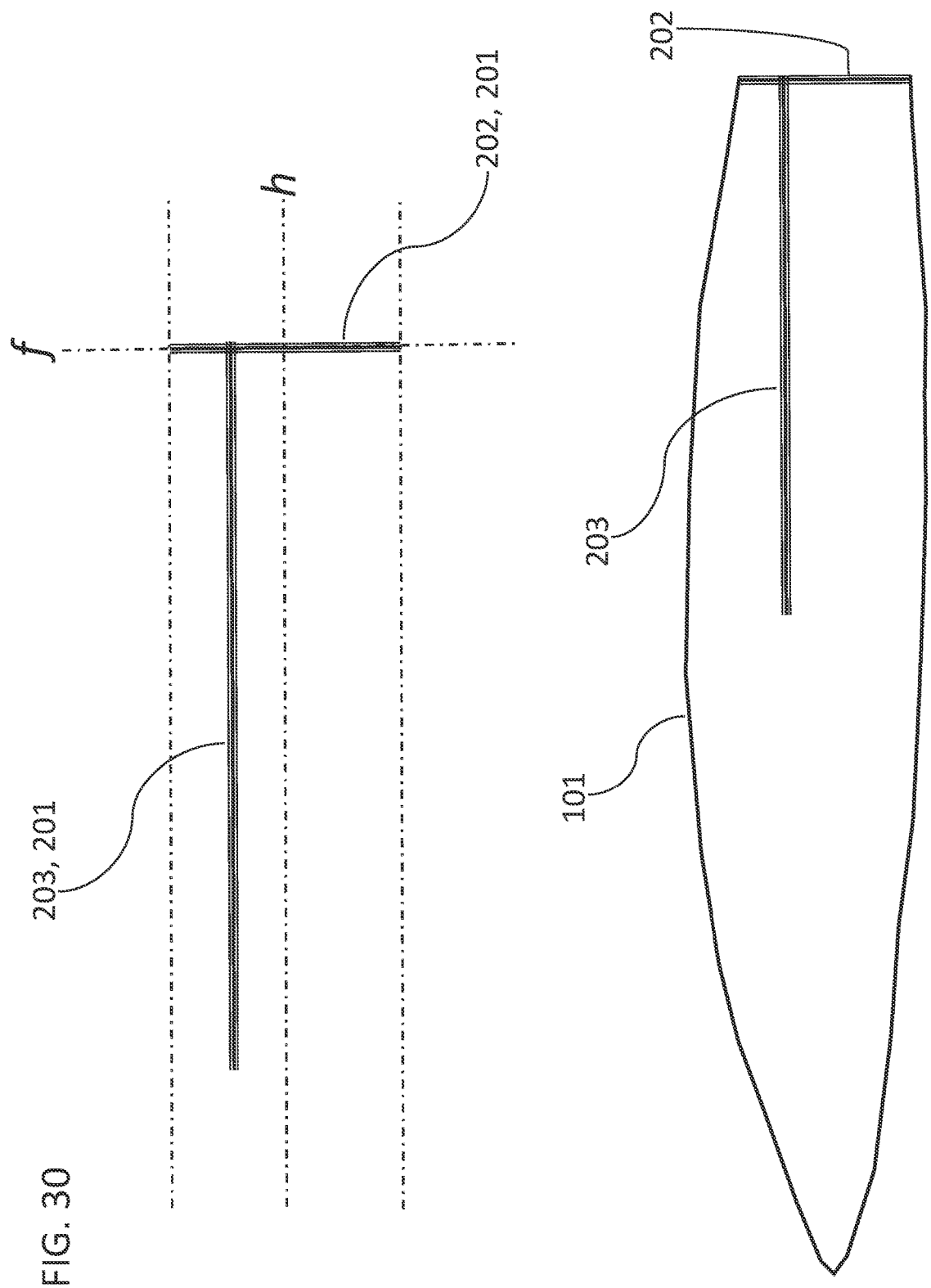

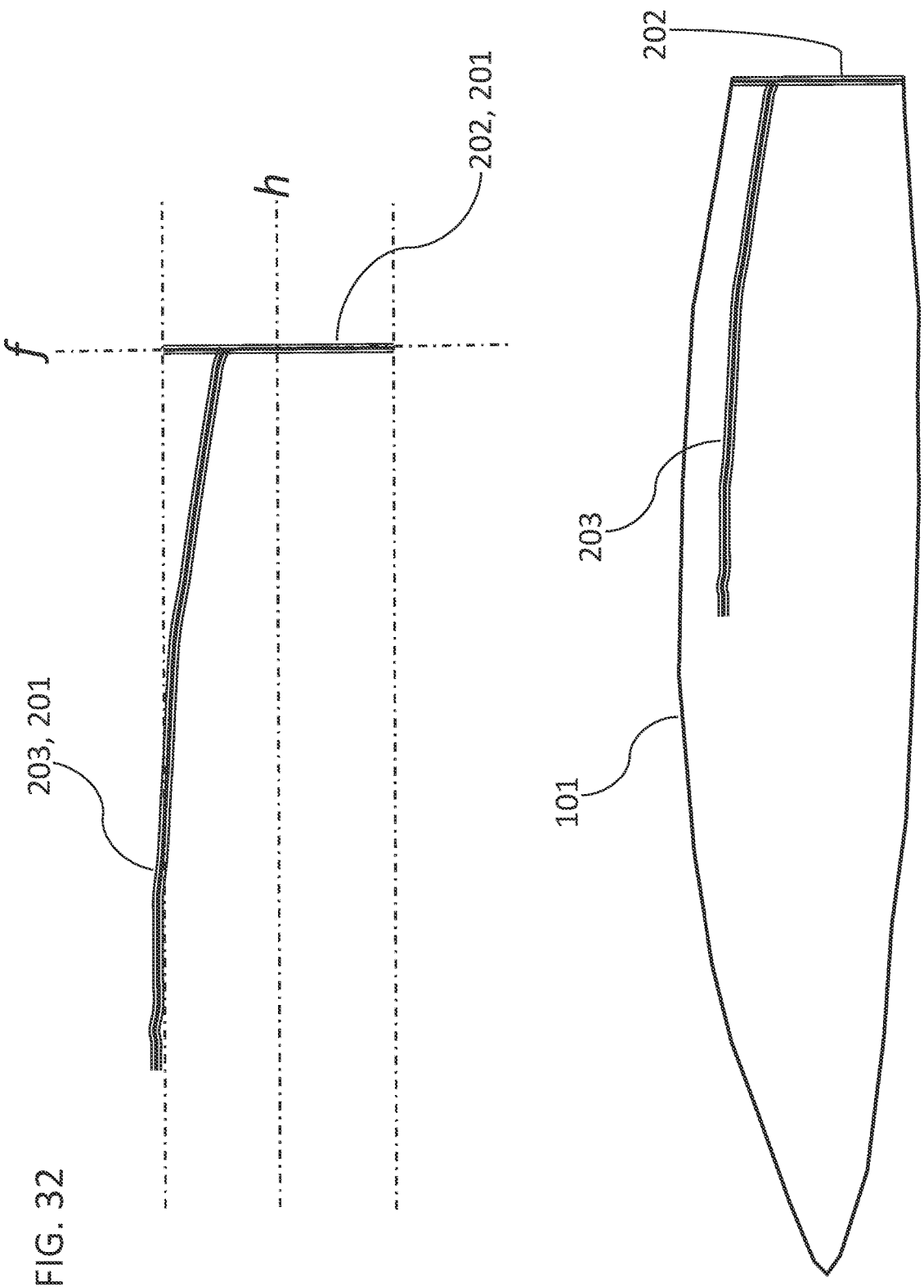

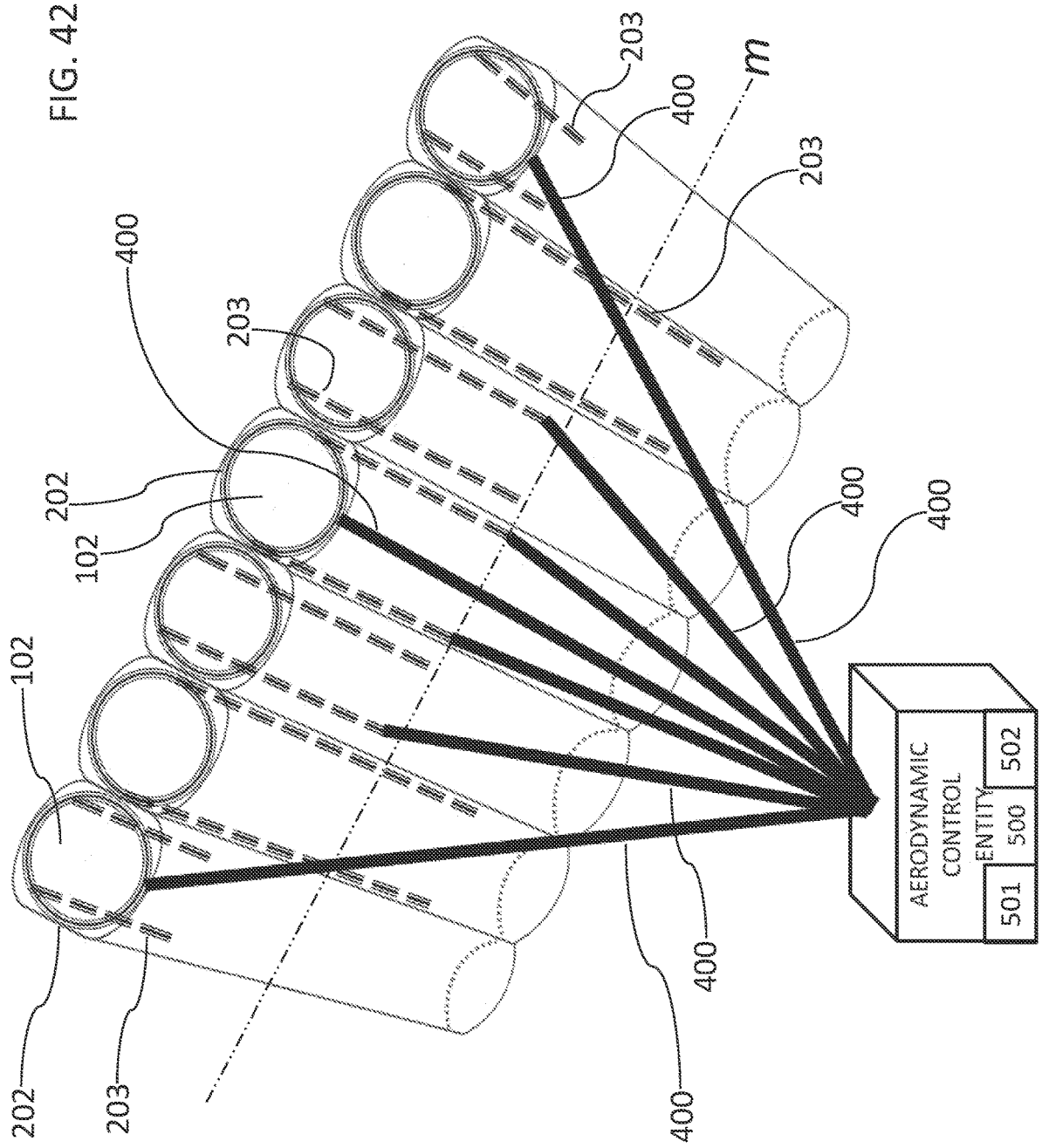

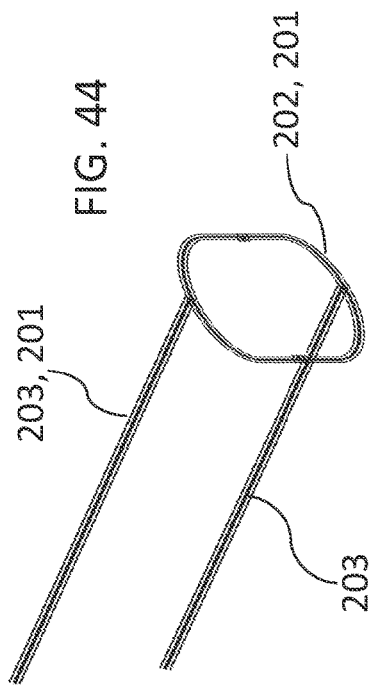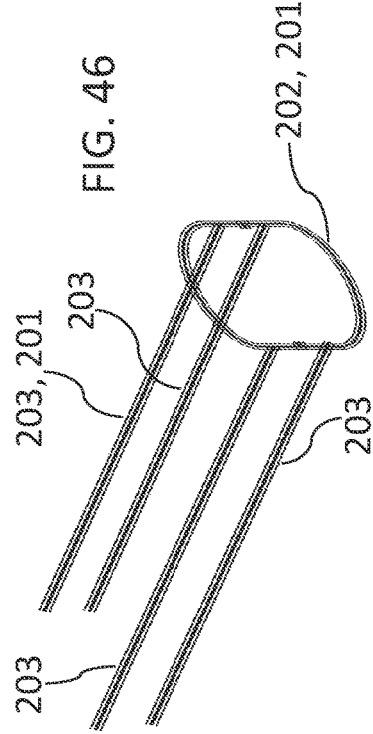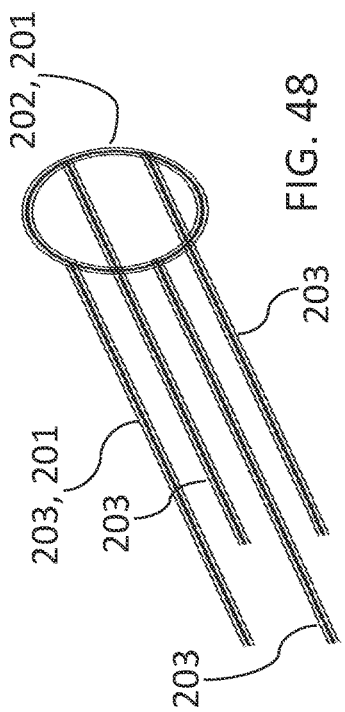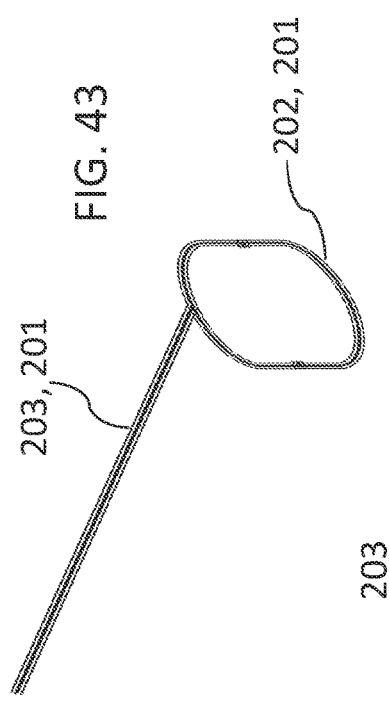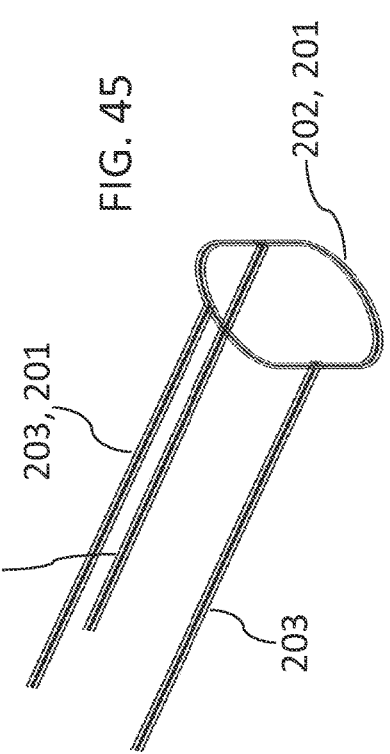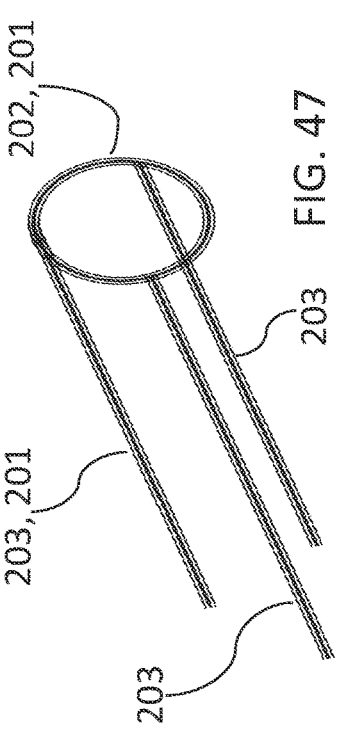

GEOMETRY ADAPTABLE SUPPORTED PARAFOIL

STATEMENT OF GOVERNMENT INTEREST

The inventorship of the invention described herein includes at least one person who made the invention in performance of his or her official duties as an employee of the Department of the Navy. The invention may be manufactured, used, and licensed by or for the Government of the United States of America for governmental purposes without payment of any royalties thereon or therefor. The Government of the United States of America has ownership rights in the invention.

BACKGROUND OF THE INVENTION

The present invention relates to devices of a non-rigid character that are designed for airborne use, more particularly to soft wing devices that operate on a principle of ram-air inflatability.

A parafoil is a flying device that, in essence, represents a kind of "non-rigid airfoil" or "soft wing." A conventional parafoil typically maintains its shape by means of pressure created by the flow of air (e.g., wind) through the textile (e.g., fabric) structure of the parafoil. By virtue of ram-air inflation of the cells, the parafoil assumes a shape describing a wing cross-section. If the airflow is unsteady or disrupted, the conventional parafoil is susceptible to collapse. Risk of collapse is minimal when a parafoil is used in the traditional manner. During a typical parachuting implementation of a parafoil, the airflow is generally steady and there are no obstructions causing vortices or other aerodynamic flows detrimental to the performance of the parafoil.

Furthermore, parafoils are commonly designed to operate at a single airspeed, wherein control is exercised via wing shape deformation. The direction and rate of descent of a conventional parafoil are controlled by deforming the trailing edge of the parafoil on either side, which primarily adds drag. According to conventional practice of parafoils, there is generally little or no ability to control the angle of attack of the parafoil, and hence little or no ability to control the amount of lift that the parafoil can produce at a given airspeed.

Parafoils have recently been considered for use as kites tethered to a surface vessel in order to lift cameras, radars, or other payloads. For example, tethered parafoil kites are currently under Navy development for deployment onboard manned and unmanned surface vessels. In such applications, the tethered parafoil is required to launch from the deck and operate within the range of airspeeds that the vessel and the accompanying environmental wind produce. An inability to effectively handle unsteady aerodynamic conditions, or to control the amount of lift, can significantly limit the operational envelope of a tethered parafoil.

SUMMARY OF THE INVENTION

In view of the foregoing, an object of the present invention is to provide a parafoil that affords better functionality—e.g., in terms of aerodynamics, stability, controllability, dependability, and robustness-under unsteady aerodynamic conditions such as associated with kite-type utilizations, as distinguished from steady aerodynamic conditions such as associated with conventional utilizations.

The present inventor calls his invention "Geometry Adaptable Supported Parafoil" (acronym, "GASP"). As exemplarily embodied, the present invention's inventive parafoil (also referred to herein as a "GASP") is an inventively enhanced ram-air wing. An exemplary GASP is a novel combination including (a) a soft wing with (b) a semi-rigid skeletal structure for support. An exemplary GASP represents a hybrid of a soft wing and, integrated therewith, a semi-rigid skeletal structure.

The aforementioned Navy testing of tethered parafoils demonstrated the need for a significantly improved parafoil for these kinds of applications, in particular a parafoil with improved stability in unsteady airflow and the ability to control lift. In one instance of Navy testing, the parafoil prototype flew through a turbulent zone, partially collapsed, and was unable to maintain lift; as a result, the parafoil vehicle lost control and impacted the water. The present inventor was especially motivated to invent the present invention for application to tethered parafoil kites. Exemplary inventive practice can markedly improve performance and reliability in such applications.

As exemplarily embodied, the present invention's GASP is an inventively enhanced soft-wing device. In accordance with exemplary inventive practice, an inventive parafoil includes a soft-wing component and a semi-rigid skeletal component. The soft wing component is made of a textile material such as a ripstop material. The semi-rigid skeleton is made of a metal, plastic, wood, or composite material. The semi-rigid skeleton imparts stability to the aerodynamic shape of the inventive parafoil, thereby promoting resistance to buckling or collapse when the inventive parafoil encounters unstable airflow. In addition, the semi-rigid skeleton provides for an ability to adjust the angle of attack without causing collapse of the inventive parafoil, thus allowing for control of the lift produced at a given airspeed.

In accordance with exemplary practice of the present invention, an inventive apparatus for aerodynamic implementation includes a textile airfoil and at least one flexibly firm structure. The textile airfoil describes a plurality of cells and has a leading edge and a trailing edge. Each cell has an air inlet at the leading edge and extends from the leading edge in a direction toward the trailing edge. Each flexibly firm structure includes an approximative annulus and a pair of juts, and is incorporated in the corresponding cell wherein the approximative annulus adjoins the air inlet, and wherein the juts protrude from the approximative annulus in proximity to the cell in a direction toward the trailing edge. The flexibly firm structure prevents collapse of the corresponding cell while the cell is undergoing ram-air inflation. According to frequent inventive practice the inventive apparatus further includes at least two trajectory lines, a winching mechanism, and a computer. Each trajectory line connects the winching mechanism with a flexibly firm structure. The computer has computer code characterized by computer program logic for enabling the computer to control the winching mechanism for adjusting the respective lengths of the trajectory lines.

An inventive parafoil may be particularly efficacious for use in a tethered kite configuration. Exemplary inventive practice addresses two major deficiencies that beset current soft wings when attempted to be utilized as tethered kites, namely (i) instability in unsteady airflows (e.g., in the airwake of a ship's superstructure), and (ii) limited ability to control lift. The present invention's GASP parafoil exhibits superior aerodynamic performance as compared to standard ram-air parafoils, especially with respect to stability in unsteady aerodynamic flows, and ability to control the amount of lift produced by the wing. An exemplary inventive parafoil can change lift and drag coefficients while remaining stable in unsteady flows.

Exemplarily practice of the present invention uniquely features, inter alia, a semi-rigid structure integrated with an inflatable soft wing. Exemplary inventive parafoils are not exceedingly more complex as compared with conventional parafoils. Yet, an exemplary inventive parafoil offers significantly increased performance in turbulent or unsteady airflow, as well as a wider speed envelope. These advantages of inventive practice are particularly manifest in tethered-kite applications operated from surface vessels.

An exemplary GASP's novel combination of (a) a skeleton and (b) ram-air inflatable cells provides a highly effective wing that offers important advantages of both a soft wing (e.g., collapsibility, durability, and performance in steady airflow) and a rigid wing (e.g., controllability and structural stability in unsteady airflow). Inventive practice is possible for a variety of parafoil designs.

According to exemplary inventive practice, the "bones" of the skeletal structure are very lightweight but strong enough to maintain their shape and carry the loads experienced during flight. Semi-rigid structures suitable for exemplary inventive practice are stiff, but can still flex enough to absorb shock during flight and to permit deformation during stowage. These semi-rigid structures are capable of flexing and deforming without breaking. As compared with a fully unsupported wing, an exemplary GASP skeleton, because of its skeleton, may be less conducive to folding into as compact a package; however, this drawback will be unimportant for many applications. For instance, applications involving stowage of parafoil kites employed onboard surface vessels typically do not require parachute-style packing. Nonetheless, an exemplary GASP is able to collapse and fold in on itself when fully deflated, similar to a typical conventional soft wing.

In conventional practice of soft wing devices, collapse is a primary failure mode for the soft wing when encountering unsteady flows. According to exemplary inventive practice, the cell-support structures situated at the leading edge prevent the corresponding cells (synonymously referred to herein as "nacelles") from collapsing. Each cell-support structure includes a ring-like structure, which is an "open" structure akin to a picture frame. A cell-support structure is joined with a cell so that the ring-like structure congruously borders upon the associated cell's air intake opening. The cell-longitudinal rod-like structures, akin to a mammal's "ribs," provide additional structural stability as well as leverage needed to adjust the angle of attack of the GASP.

BRIEF DESCRIPTION OF THE DRAWINGS

The present invention will now be described, by way of example, with reference to the accompanying drawings, wherein like numbers indicate same or similar parts or components, and wherein:

FIGS. 1 through 3 are diagrams of an example of a soft-wing component of a parafoil in accordance with the present invention. FIGS. 1 and 2 are perspective views of the soft-wing component, including its array of seven cells. FIG. 3 is a frontal elevation view of the array of intake openings in the soft-wing component. Each intake opening has a noncircular shape and is delineated at the front end of a cell (synonymously referred to herein as a "channel").

FIGS. 4 through 11 are diagrams of examples of a cell-support structure in accordance with the present invention. Each cell-support structure includes a ring-like member and two rod-like members projecting approximately perpendicularly from approximately oppose sides of the ring-like member. FIGS. 4 through 7 show a cell-support structure having a circular ring-like member. FIGS. 8 through 11 show a cell-support structure having a noncircular ring-like member. FIGS. 5 through 7 and 9 through 11 are each a perspective view of a cell support structure. FIGS. 4 and 8 are each an elevation view of a ring-like member.

FIGS. 12 and 13 are each a perspective view of a combination of a cell and a cell-support structure coupled therewith. As shown in FIG. 12, the ring-like member is circular. As shown in FIG. 13, the ring-like member is noncircular, perhaps describable as having a "racetrack" shape.

FIGS. 14 through 16 are diagrams of an example of a parafoil in accordance with the present invention. As shown in FIGS. 14 through 16, the soft-wing component shown in FIGS. 1 through 3 is coupled with a semi-rigid support framework that includes two individual cell-support structures. FIGS. 14 through 16 correspond to FIGS. 1 through 3, respectively. The cells shown in FIGS. 14 through 16 are the same as the cells shown in FIGS. 1 through 3. FIGS. 14 and 15 are perspective views of the inventive parafoil, including its cells and two cell-support structures each coupled with a cell. FIG. 16 is a view, similar to the view of FIG. 3, of the array of intake openings in the soft-wing component, wherein two of the intake openings have respective cell-support structures coupled therewith. As shown in FIG. 16, one cell-support structure includes a circular ring-like member, and the other cell-support structure includes a noncircular ring-like structure.

FIGS. 26, 28, 30, and 32 are each a side longitudinal elevation view representative of an exemplary cell-support structure. In each of FIGS. 26, 28, 30, and 32, the cell-support structure has a ring-like member that may be considered as having any of a variety of rectilinear and/or curvilinear shapes. Also shown are a horizontal geometric plane h (which vertically bisects the ring-like member) and a vertical geometric plane f (which horizontally bisects the ring-like member).

FIGS. 27, 29, 31, and 33 are views that are similar to and respectively correspond to the views of FIGS. 26, 28, 30, and 32. Each of FIGS. 27, 29, 31, and 33 shows a combination of a cell and a cell-support structure coupled therewith. FIGS. 26 and 27 each depict linear rod-like members that lie in horizontal geometric plane h. FIGS. 28 and 29 each depict curved rod-like members that are attached to the ring-like member at respective locations in horizontal geometric plane h but project generally upward so as to be primarily situated above horizontal geometric plane h. FIGS. 30 and 31 each depict linear rod-like members that are attached to the ring-like member at respective locations above horizontal geometric plane h and lie in a horizontal geometric plane that is parallel to and above horizontal geometric plane h. FIGS. 30 and 31 each depict linear rod-like members that are attached to the ring-like member at respective locations above horizontal geometric plane h and are entirely situated above horizontal geometric plane h.

As shown in FIG. 40, the leftmost, medial, and rightmost cell-support structures measure, respectively, 30%, 50%, and 70% of the chord-wise length (100%).

As shown in FIG. 41, the semi-rigid support framework has seven individual cell-support structures, wherein each individual cell-support structure has a ring-like member that is circular. The rod-like members in the semi-rigid support framework vary in length.

FIG. 42 is a perspective view, similar to the view of FIG. 41, of an example of an inventive parafoil along with a tether-and-control system associated therewith, in accordance with the present invention. The inventive parafoil shown in FIG. 42 includes the semi-rigid support framework shown in FIG. 41.

FIGS. 43 through 48 are perspective views of various examples of a cell-support structure that has a ring-like member and at least one rod-like member. Of particular note, the examples shown in FIGS. 43 through 48 differ with respect to the number of rod-like members that the cell-support structure includes. FIGS. 43 through 46 respectively show one rod-like member, two rod-like members, three rod-like members, and four rod-like members. FIGS. 47 and 48 respectively show three rod-like members and four rod-like members.

DESCRIPTION OF EXEMPLARY
EMBODIMENTS OF THE INVENTION

Referring now to the figures, an exemplary inventive parafoil includes a "soft" parafoil component 100 and a "semi-rigid" parafoil component 200. Soft parafoil component 100 represents the aerodynamic "wing" of the inventive parafoil. Semi-rigid parafoil component 200 represents the overall structural reinforcement of the inventive parafoil.

Soft parafoil component 100 is at least substantially made of a textile (e.g., fabric or cloth) material that is conventionally used for constituting the canopy of a kite, parachute, parafoil, paraglider, or Rogallo wing. Soft parafoil component 100 is also referred to herein as a textile "skin." For instance, a specially woven anti-tear ripstop material, such as nylon ripstop, may be suitable for inventive practice of soft component 100. Semi-rigid parafoil component 200 is at least substantially made of a strong, light material that is largely characterized by rigidity or stiffness but is somewhat characterized by flexibility or elasticity.

Examples of semi-rigid materials that may be suitable for inventive practice of semi-rigid component 200 are composite (e.g., carbon fiber-reinforced carbon, carbon fiber-reinforced plastic, or another fiber-reinforced matrix material), plastic (e.g., polyethylene or polyvinyl chloride), metal (e.g., aluminum, magnesium, titanium, and some alloys containing light metals such as these), and wood (e.g., spruce, birch, ash, fir, mahogany, balsa, or pine). For instance, carbon fiber-reinforced (or graphite-fiber reinforced) materials having both flexible and firm characteristics are known for various structural applications, and may be suitable for practicing the present invention's semi-rigid elements. Some materials commonly used for making fishing rods may be suitable for inventive practice of semi-rigid materials. Solid structural members are preferably implemented, but tubular structural members may additionally or alternatively be implemented, for inventive practice of semi-rigid component 200.

Figure 1:
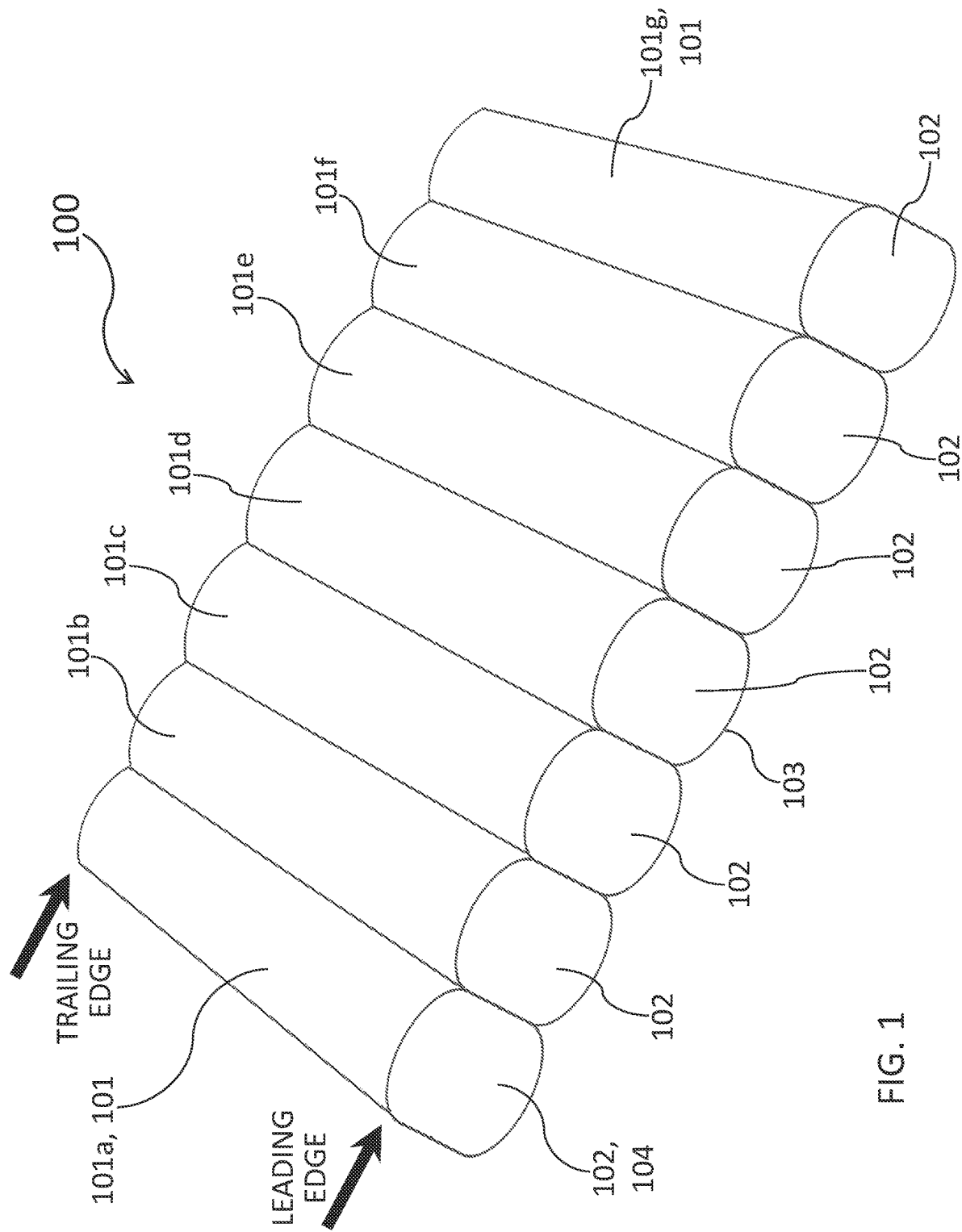

As illustrated in FIGS. 1 through 3, an example of a soft parafoil component 100 according to the present invention includes seven adjacent parallel cells 101, viz. (proceeding from left to right), cells 101a, 101b, 101c, 101d, 101e, 101f, and 101g. The terms "cell" and "channel" are used interchangeably herein. Each cell 101 has a lip 103, an interior surface 105, and an exterior surface 106. Each cell 101 is configured to define a hollow 104 and a cell intake opening 102 at its front end, which is delineated by cell 101's lip 103. Together the respective intake openings 102 describe the leading edge of soft parafoil component 100. Depending upon the inventive embodiment, soft parafoil component 100 can be configured to include practically any plural number of cells 101.

Semi-rigid parafoil component 200 includes at least one cell-support structure 201. In an exemplary inventive parafoil, each cell-support structure 201 is associated with a different cell 101. With reference to FIGS. 4 through 11, cell-support structure 201 includes a frontal support ring 202 and, protruding therefrom, a pair of lateral support rods 203. According to frequent inventive practice, ring 202 and rods 203 are solid pieces. In each cell-support structure 201, each lateral support rod 203 is connected to frontal support ring 202 at a junction 232.

When used herein to denote a frontal support ring 202, the terms "ring," "band," "hoop," and "annulus" synonymously refer to a ring-like shape that is either circular or noncircular and that represents a closed, rectilinear and/or curvilinear, geometric figure. Otherwise expressed, the word "ring" in the term "frontal support ring" for instance is used herein to convey an "approximative" ring. When used herein to denote a lateral support projection 203, the terms "projection," "rod," and "jut" synonymously refer to a rod-like shape that is characterized by rectilinearity or curvilinearity, or by both rectilinearity and curvilinearity. For instance, a lateral support structure 203 may be characterized by a degree of curvature but nonetheless describe what is essentially an elongate geometric figure that extends in a linear direction.

According to frequent inventive practice, frontal support ring 202 is configured to at least substantially conform to the shape of cell 101 along the periphery of intake opening 102. According to some inventive embodiments, frontal support ring 202 is configured to partially conform in this manner to the shape of cell 101. FIGS. 4 through 7 show a frontal support ring 202 that is circular. Depending upon the inventive embodiment, a frontal support ring 202 may also be noncircular, such as a "racetrack" shape shown in FIGS. 8 through 11. According to preferred inventive practice, the shape of frontal support ring 202 is sufficiently conformal to the shape of cell 101 at intake opening 102 so that frontal support ring 202 does not significantly impede ram-air flow through intake opening 102.

As illustrated in each of FIGS. 12 and 13, cell-support structure 201 is coupled with cell 101. Cell-support structure 201 includes frontal support ring 202 and two lateral support rods 203. FIG. 12 depicts a graphically thicker cell 101 skin in order to illustrate its interior surface 104 and exterior surface 105. Circular frontal support ring 202 is shown in FIG. 12 to conformingly adjoin circular cell lip 103 at intake opening 102. Noncircular frontal support ring 202 shown in FIG. 13 conformingly adjoins noncircular cell lip 103 at intake opening 102. The ring-like members 202 and the rod-like members 203 are shaped to maintain the nominal airfoil shape of the inventive parafoil's soft wing component 100. In the light of the instant disclosure, the ordinarily skilled artisan who practices the present invention will appreciate how to configure cell-support structure 201 in relation to cell lip 103 and cell 101 skin, doing so in furtherance of sustaining the ram-air-inflated shape of cell 101 under both stable and unstable flight conditions.

Depending upon the inventive embodiment, the coupling of cell-support structure 201 with cell 101 may be accomplished in any of various ways or combination of ways. For instance, frontal support ring 202 may be integrated with (e.g., sewn into) or bonded to cell 101 at or near cell lip 103, which circumscribes intake opening 102. Each lateral support rod 203 may be proximate to, or in contact with, or bonded to, the interior surface 104 of cell 101, or is integrated with (e.g., sewn into) the cell 101 skin. Frontal support ring 202 may exactly match the shape of cell lip 103 when cell 101 is ram-air inflated. Alternatively, frontal support ring 202 may "somewhat" match the shape of cell lip 103 when cell 101 is ram-air inflated. An example of imperfect shape-matching that may be suitable for inventive practice is illustrated by frontal support ring 202' in FIG. 14, wherein circular frontal support ring 202' is sufficiently conformal to the noncircular shape of intake opening 102 for inventive purposes of lending structural support to cell 101. This type of imperfect but sufficient conformity of frontal support ring 202 with respect to intake opening 102 is also illustrated in FIGS. 22 through 25.

Figure 28:
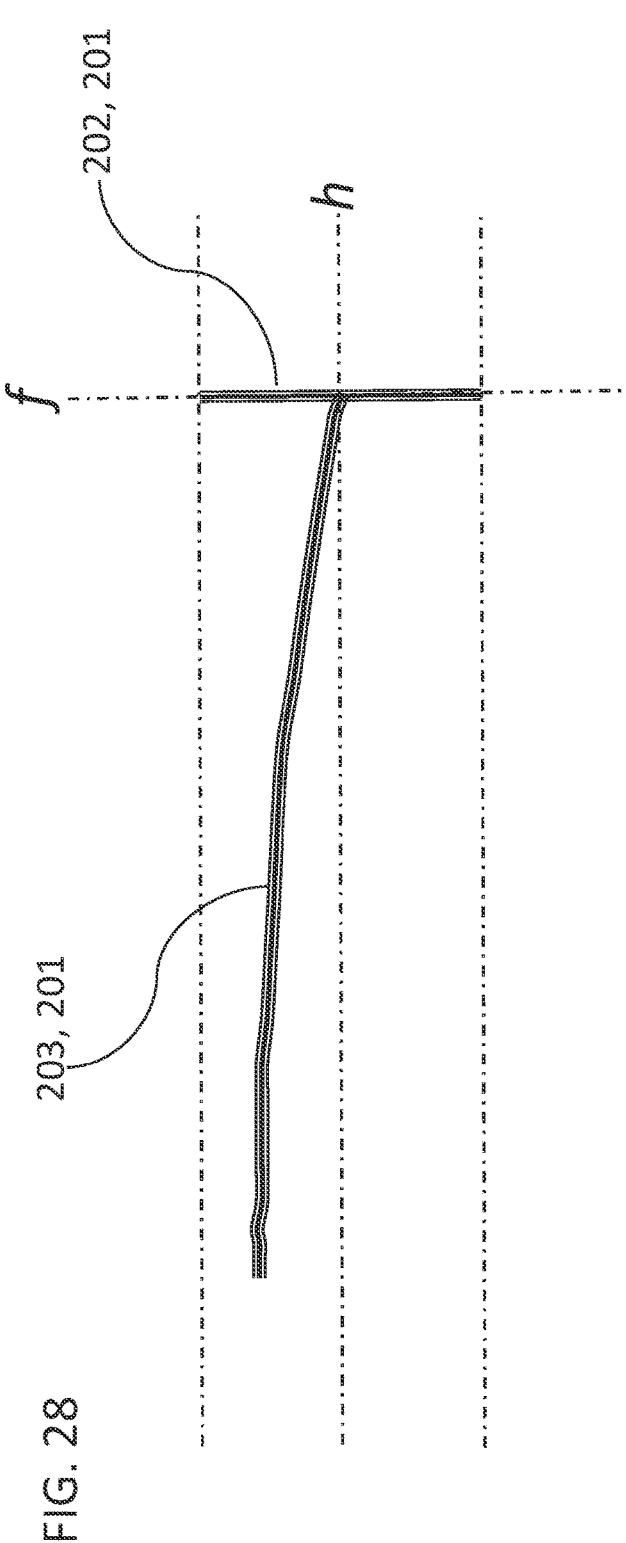
Figure 29:
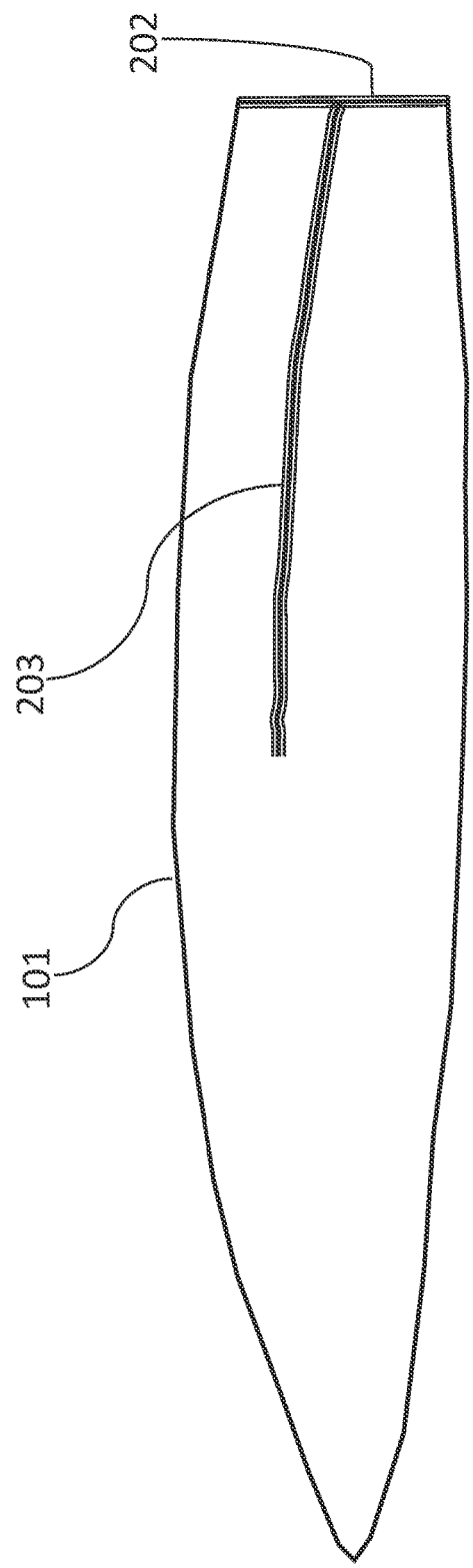

As illustrated by way of example in FIGS. 26 through 31, the two lateral support rods 203 are elongate and parallel to each other. As shown in FIGS. 26 and 27 and FIGS. 30 and 31, each lateral support rod 203 is linear (straight) and is perpendicular to geometric plane f defined by intake support ring 202. The two lateral support rods 203 shown in FIGS. 26 and 27 each lie in horizontal geometric plane h, whereas the two linear lateral support rods 203 shown in FIGS. 30 and 31 each lie in a horizontal geometric plane that is above horizontal geometric plane h. As shown in FIGS. 28 and 29 and FIGS. 32 and 33, each lateral support rod 203 is curvilinear (curved) and is angled generally upward (toward the back end of cell 101) with respect to geometric plane f defined by frontal support ring 202. In FIGS. 28 and 29, the two junctions 232 where the curved lateral support rods 203 are respectively connected to frontal support ring 202 lie in horizontal geometric plane h; in contrast, in FIGS. 32 and 33, the two junctions 232 where the curved lateral support rods 203 are respectively connected to frontal support ring 202 are located above horizontal geometric plane h. As depicted by way of example in FIGS. 12, 13, 27, 29, 31, and 33, each cell tapers and curves from front to back so as to describe in profile the cambered shape of a typical wing of an aircraft.

Figure 34:
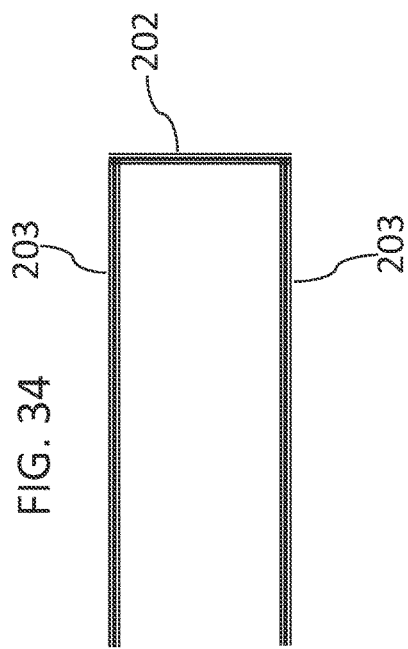
FIGS. 34 and 35 are each a top plan view representative of an exemplary cell-support structure. In each of FIGS. 34 and 35, the cell-support structure has a ring-like member that may be considered as having any of a variety of rectilinear and/or curvilinear shapes. The two rod-like members shown in FIG. 34 project from the laterally outmost limits of the ring-like member. The two rod-like members shown in FIG. 35 project from significantly within the laterally outmost limits of the ring-like member.
Figure 35:
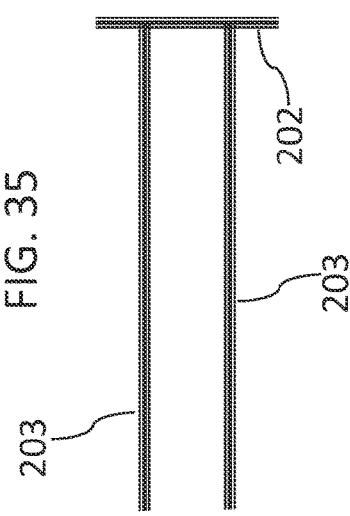
Figure 36:
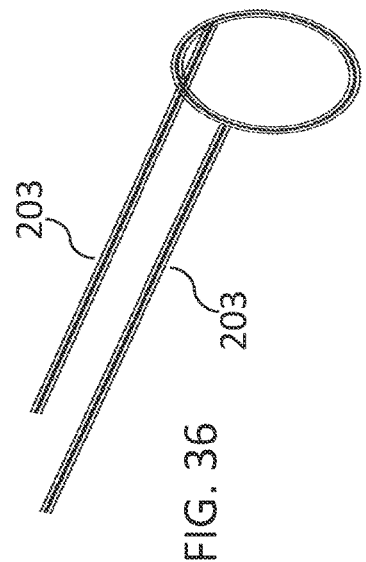
FIGS. 36 through 39 are similar perspective views of various examples of a cell-support structure having a circular ring-like member. The cell-support structures shown in FIGS. 36 through 39 differ with respect to degrees of linearity and curvature of the rod-like members, and further with respect to the locations at which the rod-like members are attached to the ring-like member.
Figure 37:
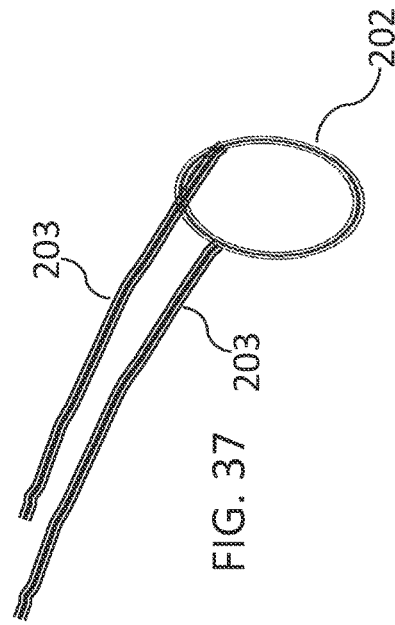
Figure 38:
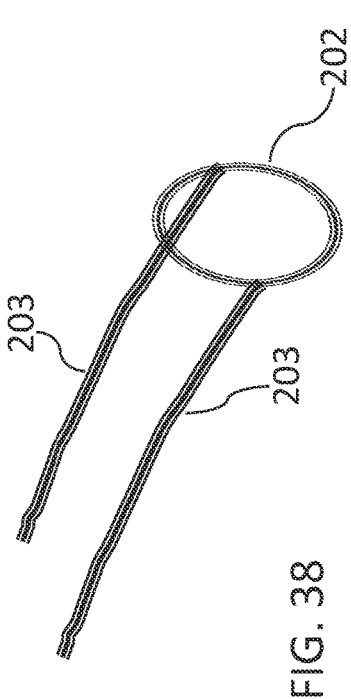
Figure 39:
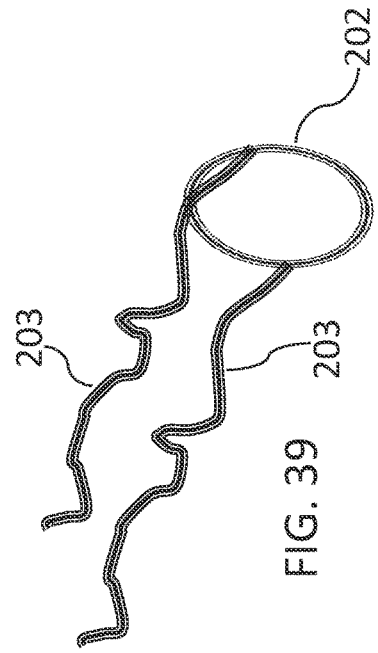
Figure 40:
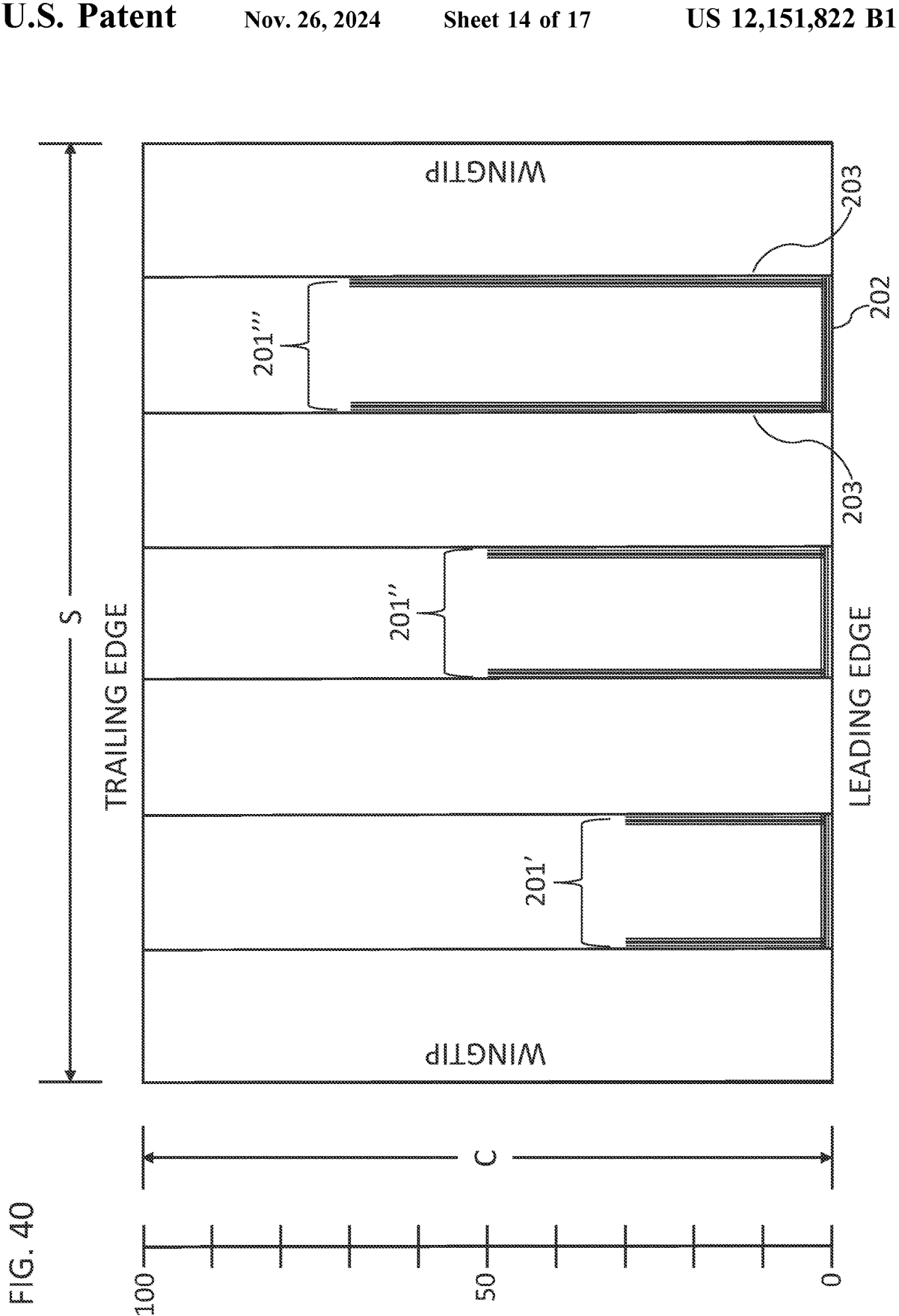
FIG. 40 is a graphical top plan view of an example of a semi-rigid support framework in accordance with the present invention. The support framework shown in FIG. 30 includes three cell-support structures each having two rod-like members of approximately the same length. A normalized scale on the lefthand side of FIG. 30 illustrates the relative lengths of the respective pairs of rod-like members, wherein the number 100 represents the chord-wise length of the inventive parafoil from its leading edge to its trailing edge.

Regardless of whether the two lateral support rods 203 in a cell-support structure 201 are straight or curved, according to frequent inventive practice each lateral support rod 203 will at least substantially lie in a horizontal geometric plane, such as illustrated by FIGS. 34, 35, and 40. FIGS. 6 through 8, 9 through 11, and 36 through 39 show, in perspective view, various examples of an a cell-support structure 201 in accordance with the present invention. The possibilities of inventive practice are limitless in terms of shapes and configurations of cell-support structure 201 overall as well as specifically its frontal support ring 202 and lateral support rods 203. FIGS. 36 through 39 illustrate, by way of example, how embodiments of lateral support rods 203 may vary in inventive practice, such as in terms of their location, orientation, linearity, and/or curvature. FIG. 39 for instance shows support rods 203 characterized by rather tortuous shapes.

Figure 41:
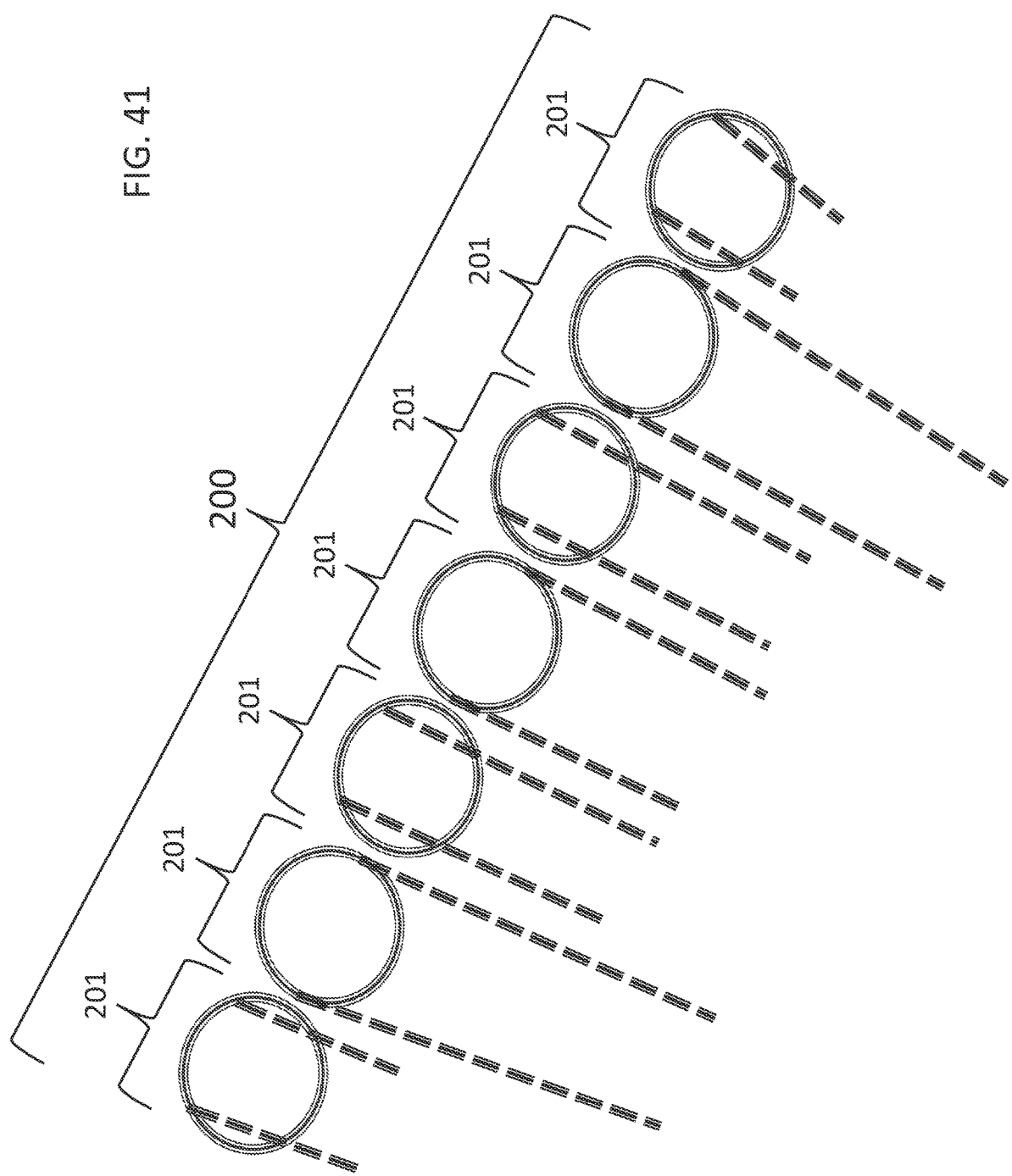
FIG. 41 is a perspective view of an example of a semi-rigid support framework in accordance with the present invention.

FIGS. 40 through 42 illustrate, by way of example, how the respective lengths of lateral support rods 203 may vary comparatively from cell-support structure 201 to cell-support structure 201, or may differ even within the same cell-support structure 201. According to frequent inventive practice, each rod-like member has a rod length in the range between 25% and 100% of the chord length. According to some inventive embodiments, each rod-like member's length is in the range between 25% and 75% of the chord length. Depending on the inventive embodiment, inventive practice is possible wherein a rod-like member's length is as small as nearly 0% or as large as 100% of the chord length, i.e., a rod-like member's length in the range 0%<[rod-like member's length]≤100%. For instance, according to some examples of inventive practice at least one rod-like member is approximately coextensive with the chordwise geometric axial length of the associated cell.

Figure 14:
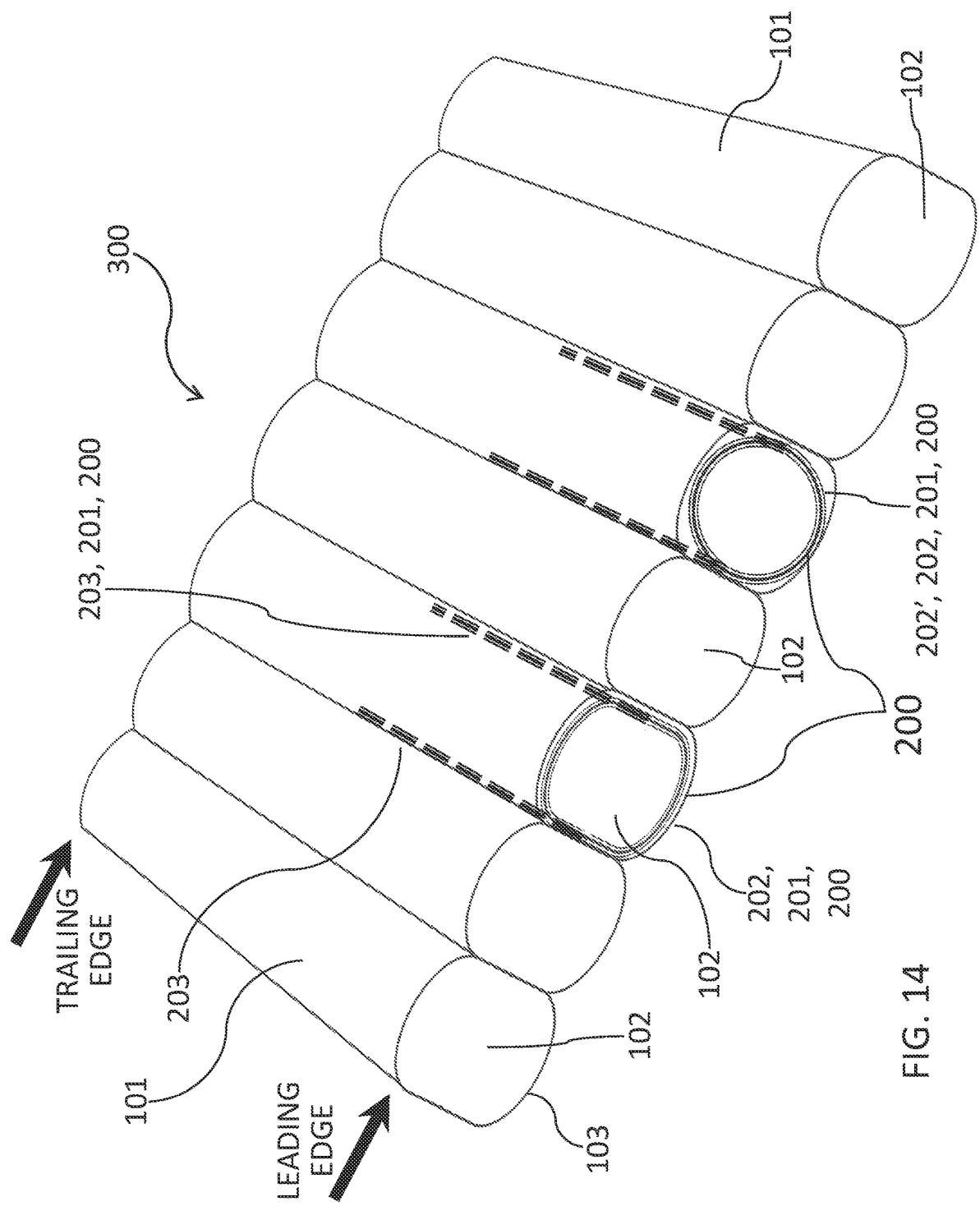

Inventive practice is possible for practically any number, combination, and permutation of cell-support structures 201 combined with corresponding cells 101 of a given soft parafoil component 100. Depending upon the inventive embodiment, one, some, or all of the cells 101 of a soft parafoil component 100 may have a cell-support structure 201 combined therewith. For instance, as shown in FIG. 42, each of the seven cells 101 of soft parafoil component 100 has incorporated with or within it a cell-support structure 201. As another example, FIGS. 14 through 16 depict a soft parafoil component 100 having seven cells 101 (viz., cells 101a, 101b, 101c, 101d, 101e, 101f, and 101g) wherein two of cells 101 (viz., cells 101c and 101e) have an associated cell-support structure 201. These two inventively supported cells 101 differ from each other with respect to the shapes of the respective intake openings 102 and of the respective frontal support rings 202, and are spaced apart separated by an unsupported cell 101 therebetween.

Figure 17:
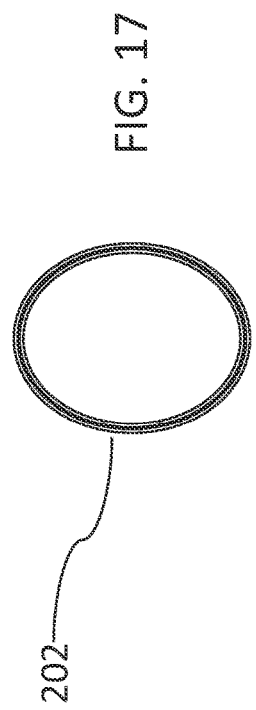
FIG. 17 is a view, similar to the views of FIGS. 4 and 8, of an oval (e.g., elliptical) ring-like structure.
Figures 18, 19, 20, 21:
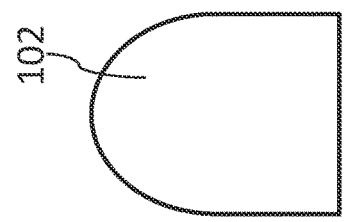
FIGS. 18 through 21 are views, similar to the view of FIG. 3 (wherein a plurality of noncircular intake openings are shown), of other examples of noncircular intake openings. Each intake opening shown in FIGS. 18 through 21 is characterized to some degree by rectilinearity and to some degree by curvilinearity.
Figures 22, 23, 24, 25:
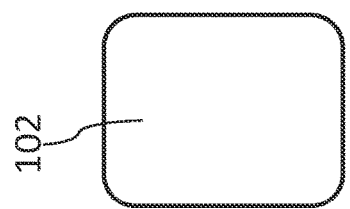
FIGS. 22 through 25 are views, similar to the view of FIG. 16 (wherein shown are a plurality of noncircular intake openings, two of which having a cell-support structure coupled therewith), of the noncircular intake openings shown in FIGS. 18 through 21, each intake opening having a cell-support structure coupled therewith. The ring-like member shown in FIG. 19 is circular; the ring-like member shown in each of FIGS. 21 through 23 is oval such as shown in FIG. 17.
Figure 26:
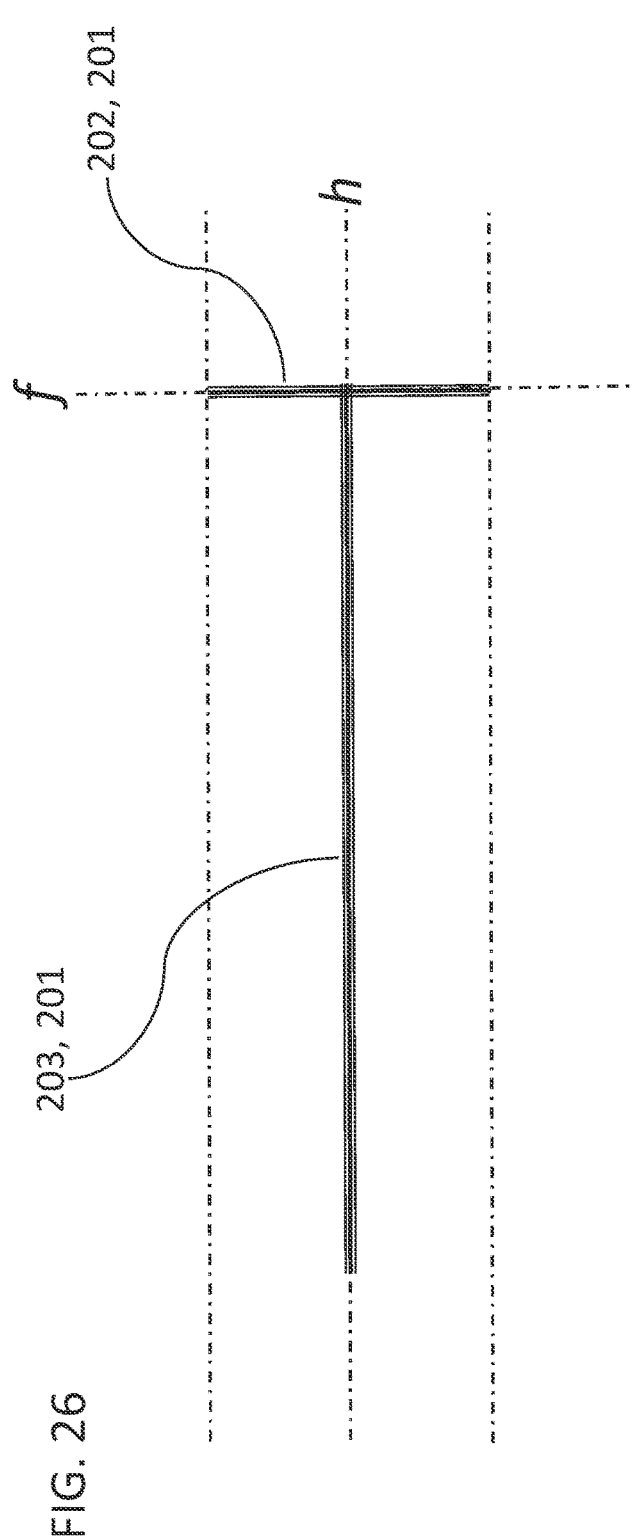
Figure 27:
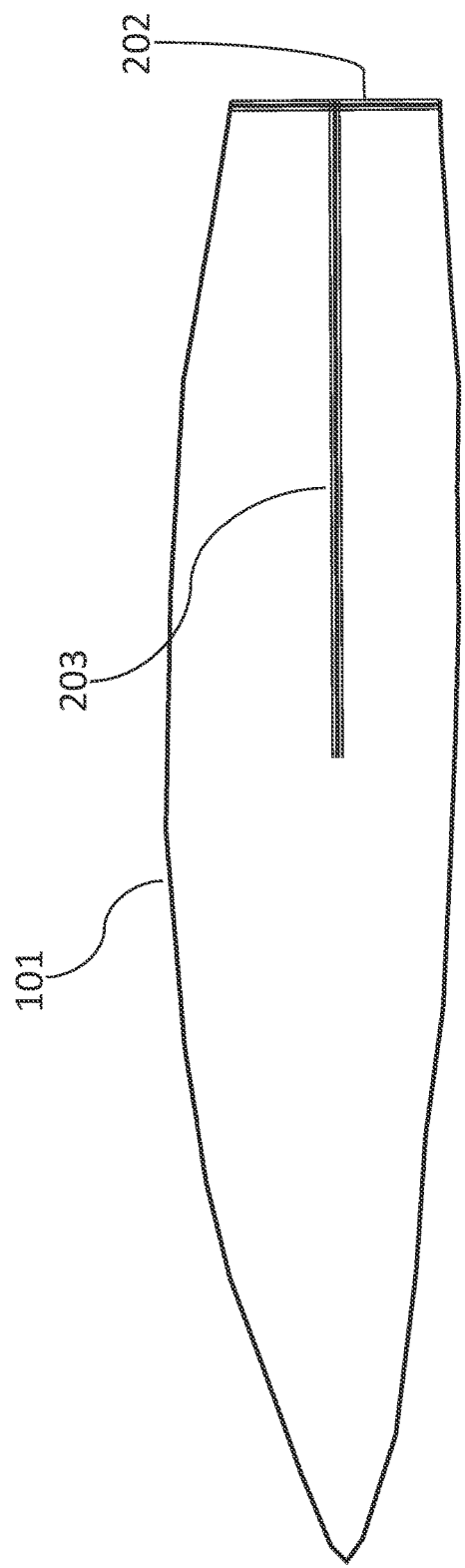

Now referring to FIGS. 43 through 48, the present invention may be variously embodied wherein a cell-support structure 201 includes a support ring 202 and practically any number of support rods 203. As previously discussed herein, according to exemplary inventive practice each cell-support structure 201 includes a support ring 202 and two support rods 203. Alternatively, an inventive parafoil may be embodied wherein at least one cell-support structure 201 (e.g., one, some, or all of the cell-support structures 201) includes a support ring 202 (such as shown for example in FIG. 4, FIG. 8, or FIG. 17) but does not include a support rod 203—e.g., wherein the support ring 202 itself is the cell-support structure 201.

Furthermore, inventive practice is possible wherein at least one cell-support structure 201 (e.g., one, some, or all of the cell-support structures 201) includes a frontal support ring 202 and also includes one support rod 203. Moreover, inventive practice is possible wherein at least one cell-support structure 201 (e.g., one, some, or all of the cell-support structures 201) includes a support ring 202 and also includes three or more support rods 203.

Note for example that support structure 201 shown in FIG. 43 has one support rod 203, which is connected at the top of support ring 202. As another example, support structure 201 shown in FIG. 44 has two support rods 203, viz., a first support rod 203 connected at the top of support ring 202 and a second support rod 203 connected at the bottom of support ring 202. FIGS. 45 and 47 each show for example a support structure 201 having three support rods 203. FIGS. 46 and 48 each show for example a support structure 201 having four support rods 203. Depending upon the inventive embodiment, an inventive parafoil may have practically any combination of support structures 201 in terms of differences, inter alia, in numbers, shapes, sizes (e.g., lengths), placements, and materials (e.g., material properties) of support rings 202 and of support rods 203.

By way of example, an inventive parafoil may be characterized in that: a first cell 101 of the inventive parafoil is fitted with a cell-support structure 201 that includes a support ring 202 but not a support rod 203; a second cell 101 of the inventive parafoil is fitted with a cell-support structure 201 that includes a support ring 202 and one support rod 203; a third cell 101 of the inventive parafoil is fitted with a cell-support structure 201 that includes a support ring 202 and two support rods 203; a fourth cell 101 of the inventive parafoil is fitted with a cell-support structure 201 that includes a support ring 202 and at least three support rods 203.

With reference to FIGS. 41 and 42, semi-rigid skeletal structure 200 not only maintains shapes of cells 201 in unsteady flows, but also provides support for making angle-of-attack adjustments by adjusting lengths of lines 400. As shown in FIG. 42, several lines 400 are each connected to a ring-like structure 202 or a rod-like structure 203. According to exemplary inventive practice, adjustment of the angle of attack may be accomplished through controlling lengths of lines 400, for instance thereby rotating the inventive parafoil about the mid-chord span-wise axis m. The lengths of the trajectory lines (e.g., ropes, wires, or cables) 400 may be controlled via an aerodynamic control entity 500, which depending upon the inventive embodiment may or may not include one or more humans.

For instance, a person may directly implement (electro) mechanical equipment 502 that regulates lines 400, and/or implement a computer 501 that sends signals to (electro) mechanical equipment 502 that regulates lines 400. Aerodynamic control entity 500 for example includes a computer 501 and/or a winching mechanism 502 or other mechanical or electromechanical device for shortening (e.g., pulling, tightening, or making more taught) and lengthening (e.g., releasing, loosening, or making more slack) the trajectory lines 400 being controlled. Inventive practice may provide for an autonomous computer, and/or provide for a computer requiring human implementation, and/or provide for direct human operation of mechanical/electromechanical machinery 502.

Depending upon the design of an inventive embodiment, there are numerous possibilities in terms of the number of lines 400, the locations on the semi-rigid component 200 to which the lines 400 are respectively connected, and the kinds, complexities, and configurations of the control systems and riggings. Inventive practice may vary in these and in many other respects. For example, an inventive parafoil may be embodied so that the lengths and/or shapes of the rod-like structures 202 differ along the span of the inventive parafoil, in order to improve flight characteristics. Furthermore, the possibilities are practically endless for configuring soft-wing component 100. For instance, twists may be incorporated in soft-wing component 100 at the wingtips to delay stall.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for aerodynamic implementation, the apparatus comprising:
    a soft parafoil component comprising a plurality of cells, said soft parafoil component having a leading edge and a trailing edge, each said cell having an air inlet at said leading edge and extending from said leading edge in a direction toward said trailing edge;
    a flexibly firm cell-support structure incorporated in a said cell, said flexibly firm cell-support structure including an annulus and a pair of lateral support rods, said annulus adjoining said air inlet, said lateral support rods protruding from said annulus in proximity to said cell in a said direction toward said trailing edge;
    the apparatus further comprising at least two trajectory lines, a winching mechanism, and a computer, each said trajectory line connecting said winching mechanism with a said flexibly firm cell-support structure, said computer having computer code characterized by computer program logic for enabling said computer to control said winching mechanism for adjusting the respective lengths of said trajectory lines.

2. The apparatus of claim 1 wherein said flexibly firm cell-support structure prevents collapse of said cell while said cell is undergoing ram-air inflation.

3. The apparatus of claim 1 wherein said soft parafoil component is made of a ripstop material.

4. The apparatus of claim 1 wherein said flexibly firm cell-support structure is made of at least one material selected from the group consisting of metal, plastic, wood, and composite.

5. The apparatus of claim 1 wherein said flexibly firm cell-support structure is a first said flexibly firm cell-support structure, wherein the device further comprises at least a second said flexibly firm cell-support structure, and wherein each said flexibly firm cell-support structure is incorporated in a different said cell.

6. The apparatus of claim 5 wherein, while said cell is undergoing ram-air inflation, each said flexibly firm cell-support structure prevents collapse of said cell in which said flexibly firm cell-support structure is incorporated.

7. A parafoil comprising a textile skin and a semi-rigid support framework, said textile skin configured to comprise an airfoil having a leading edge, a trailing edge, and at least two cells, each said cell disposed in an approximately chordwise direction between said leading edge and said trailing edge and having an air intake opening at said leading edge, said semi-rigid support framework including at least one semi-rigid cell support, each said semi-rigid cell support including a semi-rigid ring structure and two semi-rigid rod structures attached to said semi-rigid ring structure, at least one said cell being fitted with a said semi-rigid cell support wherein said semi-rigid ring structure is proximate said air intake opening and wherein each said semi-rigid rod structure extends in said approximately chordwise direction along a portion of said cell, wherein said textile skin is characterized by chord length extending between said leading edge and said trailing edge, and wherein each said semi-rigid rod structure is characterized by a rod length that is in the range between 25% and 75% of said chord length.

8. The parafoil of claim 7 wherein, during flight of said parafoil, each said semi-rigid cell support reduces risk of failure with respect to ram-air inflation of said cell with which said semi-rigid cell support is fitted.

9. The parafoil of claim 7 wherein said semi-rigid support framework includes one semi-rigid cell support.

10. The parafoil of claim 7 wherein at least two consecutive said cells are each fitted with a said semi-rigid cell support, there being no interposed said cell that is not fitted with a said semi-rigid cell support.

11. A parafoil comprising a textile skin and a semi-rigid support framework, said textile skin configured to comprise an airfoil having a leading edge, a trailing edge, and at least two cells, each said cell disposed in an approximately chordwise direction between said leading edge and said trailing edge and having an air intake opening at said leading edge, said semi-rigid support framework including at least one semi-rigid cell support, each said semi-rigid cell support including a semi-rigid ring structure and two semi-rigid rod structures attached to said semi-rigid ring structure, at least one said cell being fitted with a said semi-rigid cell support wherein said semi-rigid ring structure is proximate said air intake opening and wherein each said semi-rigid rod structure extends in said approximately chordwise direction along a portion of said cell, wherein said semi-rigid support framework includes at least two semi-rigid channel cell supports, and wherein at least two nonconsecutive said cells are each fitted with a said semi-rigid cell support, there being at least one interposed said cell that is not fitted with a said semi-rigid cell support.

12. The parafoil of claim 11 wherein each said cell is characterized by an approximately chordwise geometric axis and a vertical geometric plane in which lies said approximately chordwise geometric axis, and wherein each of said two semi-rigid rod structures is situated on opposite sides of said vertical geometric plane.

13. The parafoil of claim 11 wherein said semi-rigid support framework is made of at least one material selected from the group consisting of metal, plastic, wood, and composite.

14. The parafoil of claim 11 wherein at least two said cells are respectively fitted with differently configured said semi-rigid cell supports with respect to at least one of: the shapes of the respective said semi-rigid ring structures; the shapes of the respective said semi-rigid rod structures.

\* \* \* \* \*